United States Patent [19]

Mutoh

[11] Patent Number: 5,381,170
[45] Date of Patent: Jan. 10, 1995

[54] INK JET RECORDING APPARATUS OF THE CONTINUOUS JET TYPE

[75] Inventor: Masayuki Mutoh, Machida, Japan
[73] Assignee: SR Technos Ltd., Japan
[21] Appl. No.: 10,393
[22] Filed: Jan. 28, 1993

[30] Foreign Application Priority Data

Feb. 10, 1992 [JP] Japan .................. 4-057387

[51] Int. Cl.$^6$ .............................................. B41J 2/02
[52] U.S. Cl. ........................................ 347/74; 347/16
[58] Field of Search .................. 346/75; 347/73, 75

[56] References Cited

U.S. PATENT DOCUMENTS

| | | | |
|---|---|---|---|
| 3,928,718 | 12/1975 | Sagae et al. | 346/75 X |
| 4,281,333 | 7/1981 | Tsuzuki et al. | 346/75 X |
| 4,620,196 | 10/1986 | Hertz et al. | 346/75 |
| 4,673,951 | 6/1987 | Mutoh et al. | 346/75 |
| 4,725,852 | 2/1988 | Gamblin et al. | 346/75 |
| 4,851,860 | 7/1989 | Mutoh | 346/75 |

FOREIGN PATENT DOCUMENTS 62-225362 10/1987 Japan .

*Primary Examiner*—George H. Miller, Jr.
*Attorney, Agent, or Firm*—Cushman, Darby & Cushman

[57] ABSTRACT

A continuous ink jet recording apparatus which can record an image always with an appropriate density on any of various record media. A vibrating element driver drives a piezoelectric vibrating element in response to a disintegrating frequency signal from an oscillator to disintegrate a jet of ink from a nozzle. A multiplier multiplies picture element data of a line buffer by a density coefficient, and a pulse width modulator converts the picture element data from the multiplier into a charging controlling signal of the pulse width which increases in proportion to the number of ink drops per picture element. The charging controlling signal is applied via a high voltage switch to a controlling electrode, by which the in drops are charged in accordance with the charging controlling signal. A deflecting electrode deflects the charged ink drops. A frequency divider and a frequency converter frequency divides the disintegrating frequency signal by a gradation number and the density coefficient to obtain a picture element recording frequency signal, and a drum motor controlling circuit drives a drum motor to rotate a rotary drum at a speed in accordance with the picture element recording frequency signal.

4 Claims, 2 Drawing Sheets

INK JET RECORDING APPARATUS OF THE CONTINUOUS JET TYPE

BACKGROUND OF THE INVENTION

1. Field of the Invention

This invention relates to an ink jet recording apparatus of the continuous jet type, and, more particularly, to arm ink jet recording apparatus of the continuous jet type wherein the number of drops of ink to be placed into a picture clement is variably controlled to adjust the diameter of a recorded dot of ink in order to achieve a representation with the density of ink.

2. Description of the Related Art link jet recording apparatus of the continuous jet type are already known and disclosed, for example, in U.S. Pat. No. 4,620,196 or Japanese Patent Laid-Open Application No. 62-225362 wherein the number of drops of ink to be placed into a picture element is variably controlled to adjust the diameter of a recorded dot of ink in order to achieve a representation with the density of ink using the technique of ink jet recording of the continuous jet type.

As shown in FIG. 2, there is shown general construction of an exemplary one of conventional ink jet recording apparatus of the continuous jet type employing a rotary drum. The continuous jet type ink jet recording apparatus shown includes, as principal components thereof, a nozzle 1 to which ink under pressure is supplied by known means not shown, an ink electrode 2 for connecting the potential of the ink in the nozzle 1 to the ground potential level, a piezoelectric vibrating element 3 mounted on the nozzle 1, an oscillator OSC for generating a disintegrating frequency signal $f_d$ having a fixed disintegrating frequency $f_d$ (in the following description, a same reference character is applied to both of a signal and a frequency), a vibrating element driver CD for amplifying the disintegrating frequency signal $f_d$ from the oscillator OSC to drive the piezoelectric vibrating element 3 and synchronously disintegrate a jet of the ink (which may be hereinafter referred to as jet or ink jet), a controlling electrode 4 having a circular opening or a slit-like opening coaxial with the nozzle 1 for receiving a charging controlling signal to control charging of the ink jet in accordance with image data, a grounding electrode 5 disposed in front of the controlling electrode 4 and grounded itself, a knife edge 6 mounted on the grounding electrode 5, a deflecting high voltage dc power source (hereinafter referred to simply as deflecting power source) 7, a deflecting electrode 8 connected to the deflecting power source 7 for cooperating with the grounding electrode 5 to produce therebetween an intense electric field perpendicular to an ink jet flying axis to deflect a charged ink drop to the grounding electrode 5 side, a line buffer LB for storing therein picture element data for one rotation of a rotary drum DR, a pulse width modulator PWM for modulating picture element data read out from the line buffer LB in synchronism with an encoder clock signal $f_E$ from a shaft encoder SE coupled to a shaft of the rotary drum DR into a width of a pulse in synchronism with the encoder clock signal $f_E$ and the disintegrating frequency signal $f_d$ outputted from the oscillator OSC, a high voltage switch HVS for converting a charging controlling signal outputted from the pulse width modulator PWM into a high voltage, a frequency divider DV for frequency dividing the disintegrating frequency signal $f_d$ outputted from the oscillator OSC to 1/n (n is a positive integral number), and a drum motor controlling circuit DMC for receiving the output $f_d/n$ of the frequency divider DV as an instruction input and the encoder clock signal $f_E$ from the shaft encoder SE as a feedback input and controlling the rotation of a drum motor DRM coupled to the shaft of the rotary drum DR so that the received signals $f_d/n$ and $f_E$ may satisfy the relationship $f_E = f_d/n$. A record medium RM is wrapped around the rotary drum DR.

In the continuous jet type ink jet recording apparatus of the construction described above, a picture element is recorded on the record medium RM in synchronism with the encoder clock signal $f_E$. Meanwhile, an ink drop is formed in synchronism with the disintegrating frequency signal $f_d$ outputted from the oscillator OSC. Further, the drum motor controlling circuit DMC controls the rotation of the drum motor DRM so that the relationship $f_E = fd/n$ may be satisfied. Accordingly, at the greatest a total number n of ink drops which depends upon the frequency dividing ratio n of the frequency divider DV are allotted to one picture element (in the following description of the conventional continuous jet type ink jet recording apparatus, the value n will be hereinafter referred to as maximum ink drop number per picture element). Each of picture element data stored in the line buffer LB represents the number of those of maximum n ink drops per picture element which are to be used for recording of the picture element, and the pulse width modulator PWM operates in accordance with such picture element data so that a shaded image, that is, an image having gradation in density, is recorded on the record medium RM. In this instance, a half tone representation of n gradations can be obtained. Thus, with the conventional continuous jet type ink jet recording apparatus, the maximum ink drop number n per picture element coincides with the gradation number n.

By the way, the maximum ink drop number n per picture element with which an appropriate image density is obtained (that is, an appropriate adhered ink amount) varies to a great extent depending upon the picture element density and the ink absorbing capacity of the record medium. For example, when a light transmitting original such as a film for an OHP (overhead projector) is to be produced, the amount of ink equal to almost twice that of ink used for a light reflecting print of ordinary paper or the like must be adhered to the film.

The conventional continuous jet type ink jet recording apparatus described above is disadvantageous in that it can record only on very limited record media, such as ordinary paper, since the maximum ink drop number n per picture element is a fixed value.

It is further disadvantageous in that it is very low in flexibility in that, when the maximum ink drop number n per picture element is to be changed, a modification to the hardware or firmware is required.

SUMMARY OF THE INVENTION

It is an object of the present invention to provide a continuous ink jet recording apparatus which can record an image always with an appropriate density on any of various record media.

In order to attain the object described above, there is provided an ink jet recording apparatus of the continuous jet type, which comprises disintegrating frequency signal generating means for outputting a disintegrating frequency signal, disintegrating means for disintegrating a jet of ink into a series of ink drops in synchronism with the disintegrating frequency signal, pulse width modulating means for converting the disintegrating frequency signal into a charging controlling signal having a pulse width which increases in proportion to a number of drops of ink per picture element equal to picture element data of a number n of gradations multiplied by a density coefficient m, n being a positive integral number, m being equal to 1, 2, 3, ... or $\frac{1}{2}, \frac{1}{3}, \frac{1}{4}, ...$ under the condition that mn is an integral number equal to or greater than 1, charging means for charging the drops of ink in accordance with the charging controlling signal, deflecting means for deflecting the drops of ink charged by the charging means, and record face moving means for frequency dividing the disintegrating frequency signal by a maximum ink drop number mn per picture element obtained by multiplication of the gradation number n by the density coefficient m to produce a picture element recording frequency signal and for moving a record face of a record medium relative to the deflecting means at a speed in accordance with the picture element recording frequency signal.

In the ink jet recording apparatus of the continuous jet type, the disintegrating frequency signal generating means outputs a disintegrating frequency signal, and the disintegrating means disintegrates a jet of ink into a series of ink drops in synchronism with the disintegrating frequency signal. The pulse width modulating means converts the disintegrating frequency signal into a charging controlling signal having a pulse width which increases in proportion to a number of drops of ink per picture element equal to picture element data of a number n of gradations multiplied by a density coefficient m, n being a positive integral number, m being equal to 1, 2, 3 ... or $\frac{1}{2}, \frac{1}{3}, \frac{1}{4}$ ... under the condition that mn is an integral number equal to or greater than 1. The charging means charges the drops of ink in accordance with the charging controlling signal, and the deflecting means deflects the drops of ink charged by the charming means. The record face moving means frequency divides the disintegrating frequency signal by a maximum ink drop number mn per picture element obtained by multiplication of the gradation number n by the density coefficient m to produce a picture element recording frequency signal, and moves a record face of a record medium relative to the deflecting means at a speed in accordance with the picture element recording frequency signal.

With the ink jet recording apparatus of the continuous jet type, by variably setting the density coefficient m from the outside, the maximum ink drop number mn per picture element (appropriate applied ink amount) with which an appropriate density can be obtained can be controlled in a wide range in accordance with a characteristic of a record medium used. Accordingly, the ink jet recording apparatus of the continuous jet type is advantageous in that it can record an image in an appropriate density on any of various record media. Particularly where the density coefficient m is set to 2, a transmission image of a good image density can be recorded onto an OHP film.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
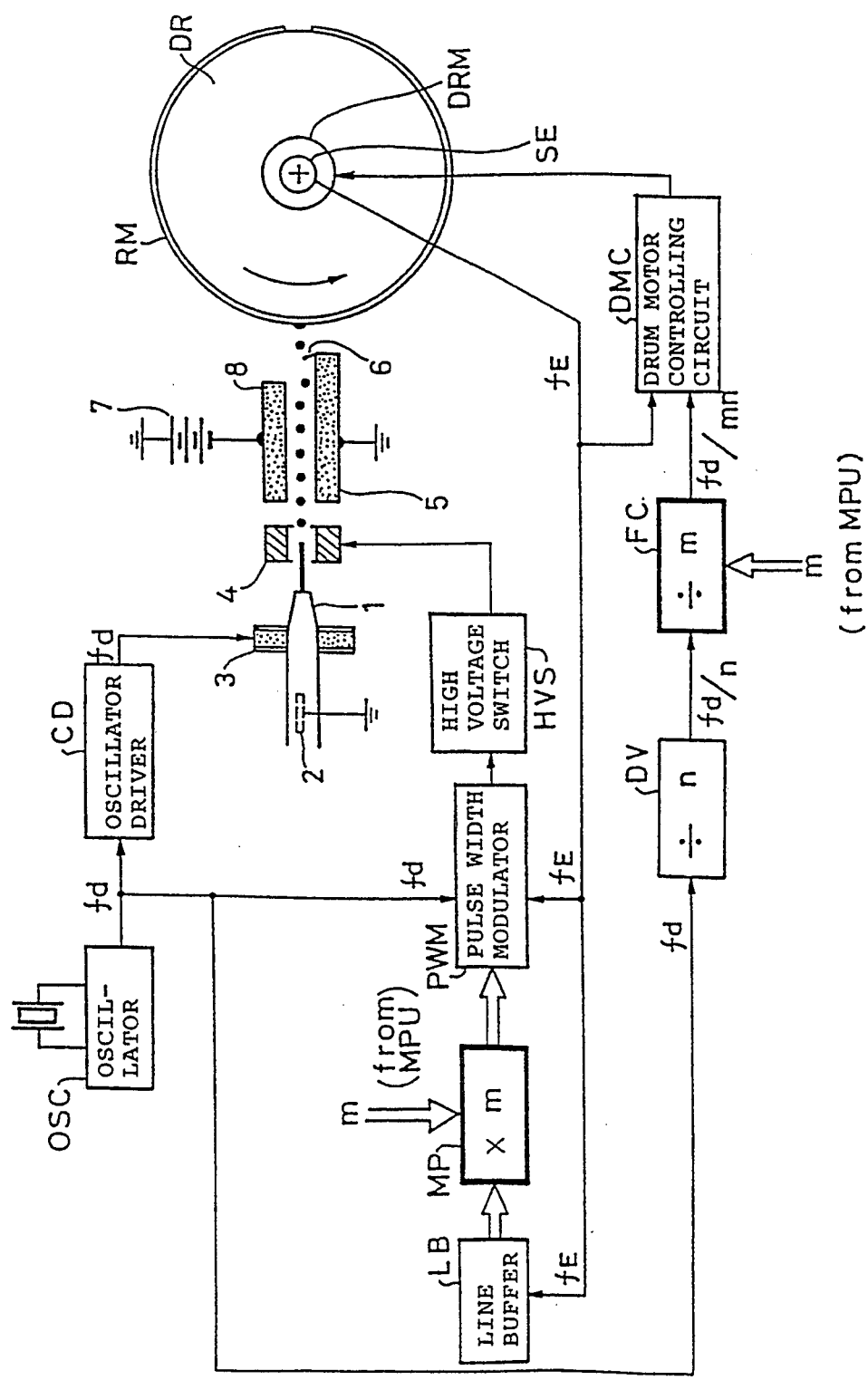
FIG. 1 is a diagrammatic representation of an ink jet recording apparatus of the continuous jet type showing a preferred embodiment of the present invention.
Figure 2:
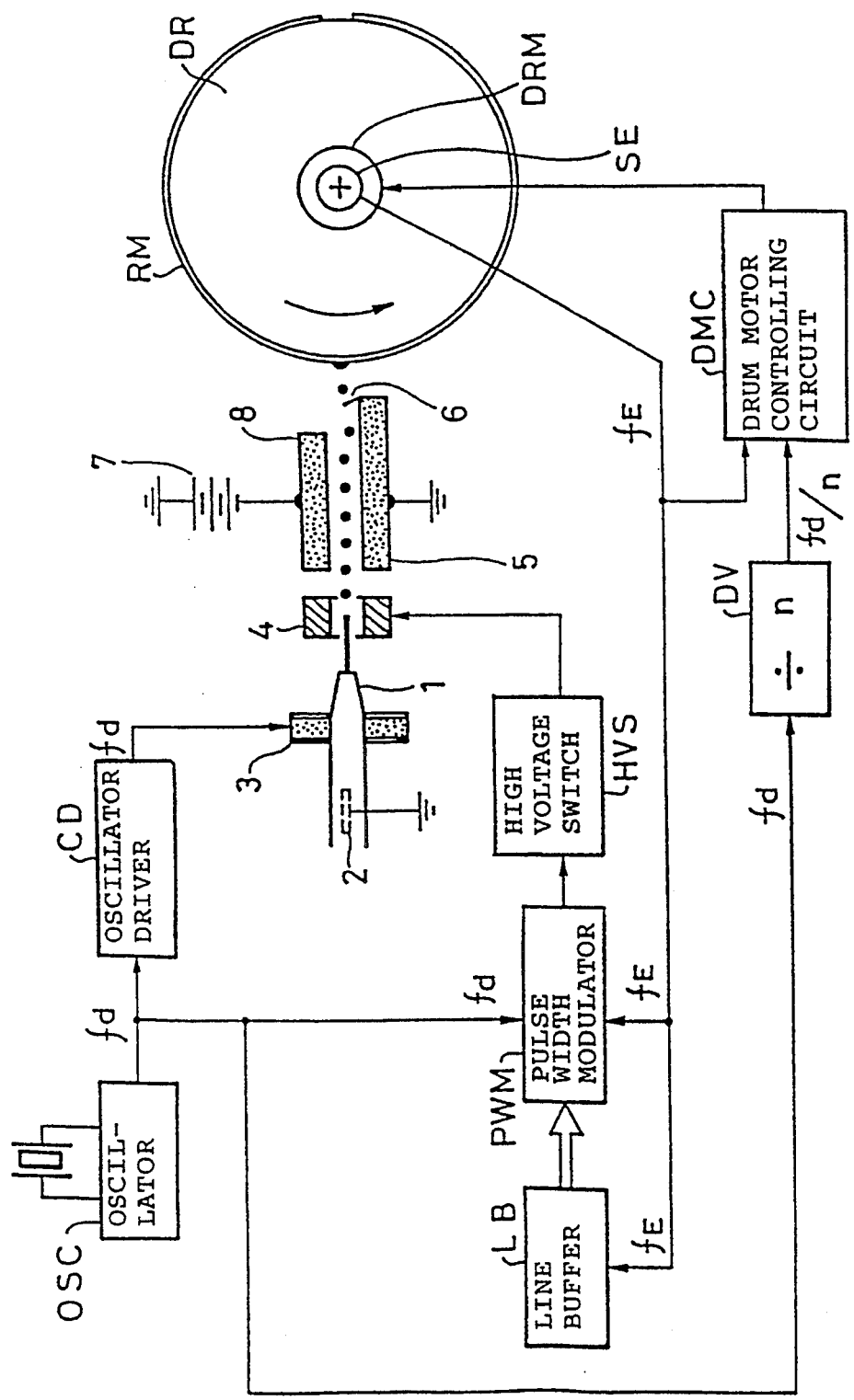
FIG. 2 is a similar view but showing a conventional ink jet recording apparatus of the continuous jet type.

As shown in FIG. 1, there is shown an ink jet recording apparatus of the continuous jet type to which the present invention is applied. The continuous jet type ink jet recording apparatus shown includes, as principal components thereof, similarly as in the conventional continuous jet type ink jet recording apparatus described hereinabove, a nozzle 1 to which ink under pressure is supplied by known means not shown, an ink electrode 2 for connecting the potential of the ink in the nozzle 1 to the ground potential level, a piezoelectric vibrating element 3 mounted on the nozzle 1, an oscillator OSC for generating a disintegrating frequency signal $f_d$ having a fixed disintegrating frequency $f_d$, a vibrating element driver CD for amplifying the disintegrating frequency signal $f_d$ from the oscillator OSC to drive the piezoelectric vibrating element 3 and synchronously disintegrate an ink jet, a controlling electrode 4 having a circular opening or a slit-like opening coaxial with the nozzle 1 for receiving a charging controlling signal to control charging of the ink jet in accordance with image data, a grounding electrode 5 disposed in front of the controlling electrode 4 and grounded itself, a knife edge 6 mounted on the grounding electrode 5, a deflecting power source 7, a deflecting electrode 8 connected to the deflecting power source 7 for cooperating with the grounding electrode 5 to produce therebetween an intense electric field perpendicular to an ink jet flying axis to deflect a charged ink drop to the grounding electrode 5 side, a line buffer LB for storing therein picture element data for one rotation of a rotary drum DR, a pulse width modulator PWM for modulating picture element data read out from the line buffer LB in synchronism with an encoder clock signal $f_E$ from a shaft encoder SE coupled to a shaft of the rotary drum DR into a width of a pulse in synchronism with the encoder clock signal $f_E$ and the disintegrating frequency signal $f_d$ outputted from the oscillator OSC, a high voltage switch HVS for converting a charging controlling signal outputted from the pulse width modulator PWM into a high voltage, a frequency divider DV for frequency dividing the disintegrating frequency signal $f_d$ outputted from the oscillator OSC to 1/n (n is a positive integral number), and a drum motor controlling circuit DMC for receiving the output $f_d/n$ of the frequency divider DV as an instruction input and the encoder clock signal $f_E$ from the shaft encoder SE as a feedback input and controlling the rotation of a drum motor DRM coupled to the shaft of the rotary drum DR so that the received signals $f_d/n$ and $f_E$ may satisfy the relationship $f_E = f_d/n$. A record medium RM is wrapped around the rotary drum DR.

The ink jet recording apparatus of the present embodiment further includes a multiplier MP interposed between the line buffer LB and the pulse width modulator PWM, and a frequency converter FC interposed between the frequency divider DV and the drum motor controlling circuit DMC. A density coefficient m can be variably set to both of the multiplier MP and the frequency converter FC from the outside such as, for example, an operation panel or a host computer.

Since the gradation number n (in the following description of the continuous jet type ink jet recording apparatus of the present embodiment, n represents a gradation number) is a positive integral number, the density coefficient m can be set to an arbitrary one of the values m=1, 2, 3 ... and ½, ⅓, ¼, ... under the condition that the maximum ink drop number mn per picture element (in the following description of the continuous jet type ink jet recording apparatus of the present embodiment, mn represents a maximum ink drop number per picture element) is an integral number equal to or greater than 1.

In operation, the oscillator OSC oscillates in a fixed disintegrating frequency $f_d$ and outputs a disintegrating frequency signal $f_d$.

The vibrating element driver CD amplifies the disintegrating frequency signal $f_d$ from the oscillator OSC to drive the piezoelectric vibrating element 3 and disintegrate an ink jet emitted from the nozzle 1 into a series of ink drops in synchronism with the disintegrating frequency signal $f_d$.

Meanwhile, the multiplier MP multiplies picture element data read out from the line buffer LB in synchronism with the encoder clock signal $f_E$ from the shaft encoder SE coupled to the shaft of the rotary drum DR by the density coefficient m set thereto from the outside and outputs the product as an ink drop number per picture element.

The pulse width modulator PWM generates a charging controlling signal having a pulse width, which increases in proportion to the ink drop number per picture element obtained by multiplication of the picture element data by the density coefficient m by the multiplier MP, in units of the period of the disintegrating frequency signal $f_d$ in synchronism with the encoder clock signal $f_E$. The pulse width modulator PWM applies the thus generated charging control signal by way of the high voltage switch HVS to the controlling electrode 4 to charge the ink jet from the nozzle 1.

Meanwhile, the frequency divider DV divides the frequency of the disintegrating frequency signal $f_d$ by the gradation number n and outputs the resulted signal.

The frequency converter FC further divides the frequency of the output of the frequency divider DV by the density coefficient m and outputs a picture element recording frequency signal $f_d/mn$ obtained by the frequency division.

The drum motor controlling circuit DMC receives the picture element recording frequency signal $f_d/mn$ outputted from the frequency converter FC as an instruction input and the encoder clock signal $f_E$ from the shaft encoder SE as a feedback input and controls the rotation of the drum motor DRM coupled to the shaft of the rotary drum DR so that the relationship $f_E = f_d/mn$ may be satisfied.

Now, when it is tried to produce, as an example, a reflection print of 16 gradations on ordinary paper with the disintegrating frequency $f_d$ of $10^6$ Hz, the gradation number n is 16 and the density constant m is 1, and accordingly, the picture element recording frequency $f_d/mn$ is 62.5 kHz and the time $mn/f_d$ allotted to recording of one picture element is 16 μsec. In this instance, picture element data of the line buffer LB are data of 4 bits per picture element.

Subsequently, recording of the same image as a transmission image having an appropriate density onto an OHP film will be described. In this instance, if it is assumed that an appropriate transmission density is obtained with the double amount of adhered ink, then the density coefficient m is set to 2. When the density coefficient m is set to 2, since the gradation number n remains equal to 16, the picture element recording frequency $f_d/mn$ is 31.25 kHz, and, consequently, the speed of rotation of the rotary drum DR is reduced to one half that when the density coefficient m is 1 and the time $mn/f_d$ allotted to recording of one picture element is 32 μsec which is twice that for production of a reflection print. Meanwhile, the picture element data of the line buffer LB are doubled by the multiplier MP so that they are converted from data of 4 bits/picture element into data of 5 bits/picture element ($2^5 = 32$ at the maximum). Consequently, the pulse width of the charging controlling signal after conversion by the pulse width modulator PWM changes from 16 μsec at the maximum to 32 μsec at the maximum, and the maximum ink drop number mn allotted to recording of one picture element changes from 16 drops/picture element to 32 drops/picture element.

In this manner, only by setting the density coefficient m to 2 from the outside, the picture element recording time $mn/f_d$ is increased to twice and also the maximum ink drop number per picture element allotted to recording of one picture element is simultaneously increased to twice, and, accordingly, a transmission image having an appropriate density is recorded onto an OHP film.

It is to be noted that, while the operation of the continuous jet type ink jet recording apparatus of the present embodiment when the density coefficient m is equal to 2 has been described above, an image can be recorded with an appropriate density on any of various record media by variably setting the density coefficient m under the condition described above.

By the way, while the continuous jet type ink jet recording apparatus of the present embodiment is described including the multiplier MP and the frequency converter FC, the present invention is not limited to the embodiment of the specific construction described above. For example, instead of multiplying picture element data of the line buffer LB by the density coefficient m using the multiplier MP, picture element data may be written into the line buffer LB after they are multiplied by m by a controlling circuit not shown of the continuous jet type ink jet recording apparatus. Or else, picture element data multiplied by m by the host computer may be transferred to the continuous jet type ink jet recording apparatus.

Further, the frequency divider DV and the frequency converter FC may be replaced by a single combined frequency converter which produces a picture element recording frequency signal $f_d/mn$ from a disintegrating frequency signal $f_d$.

Furthermore, while a continuous jet type ink jet recording apparatus of the Hertz type wherein charged ink drops are deflected and removed and non-charged ink drops are used for recording is described in the embodiment, the present invention can naturally be applied to a continuous jet type ink jet recording apparatus of the sweet type wherein non-discharged ink drops are removed but charged ink drops are used for recording.

Having now fully described the invention, it will be apparent to one of ordinary skill in the art that many changes and modifications can be made thereto without departing from the spirit and scope of the invention as set forth herein.

I claim:

1. An ink jet recording apparatus of the continuous jet type, comprising:

frequency signal generating means for outputting a disintegrating frequency signal;

means for disintegrating a jet of ink into a series of ink drops in synchronism with the disintegrating frequency signal;

pulse width modulating means for converting the disintegrating frequency signal into a charging controlling signal having a pulse width that increases in proportion to a number of drops of ink per picture element equal to picture element data of a number n of gradations multiplied by a density coefficient m being variably set, n being a positive integral number, m being equal to 1, 2, 3, ... or $\frac{1}{2}$, $\frac{1}{3}$, $\frac{1}{4}$ ... under the condition that mn is an integral number equal to or greater than 1;

charging means for charging the drops of ink in accordance with the charging controlling signal;

deflecting means for deflecting the drops of ink charged by said charging means; and record face moving means, including a rotatable record-face supporting drum driven by a drum rotating motor, for frequency dividing the disintegrating frequency signal by a maximum ink drop number mn per picture element obtained by multiplication of the gradation number n by the density coefficient m to produce a picture element recording frequency signal and for controlling said drum rotating motor for moving a record face of a record medium supported on said drum relative to said deflecting means at a speed in accordance with the picture element recording frequency signal.

2. An ink jet recording apparatus of the continuous jet type as claimed in claim 1, wherein said pulse width modulating means includes a multiplier for multiplying picture element data by the density coefficient m, and a pulse width modulator for converting the disintegrating frequency signal into a charging controlling signal having a pulse width which increases in proportion to an output of said multiplier.

3. An ink jet recording apparatus of the continuous jet type as claimed in claim 1, wherein said record face moving means includes frequency dividing means for frequency dividing the disintegrating frequency signal by the maximum ink drop number mn per picture element, and a drum motor controlling circuit for controlling driving of said drum motor in accordance with the picture element recording frequency signal from said frequency dividing means.

4. An ink jet recording apparatus of the continuous jet type as claimed in claim 1, wherein the density coefficient m is set to 2.

* * * * *